Aug. 10, 1954   H. B. HATFIELD, JR   2,685,764
GLASS CUTTER
Filed Dec. 29, 1952
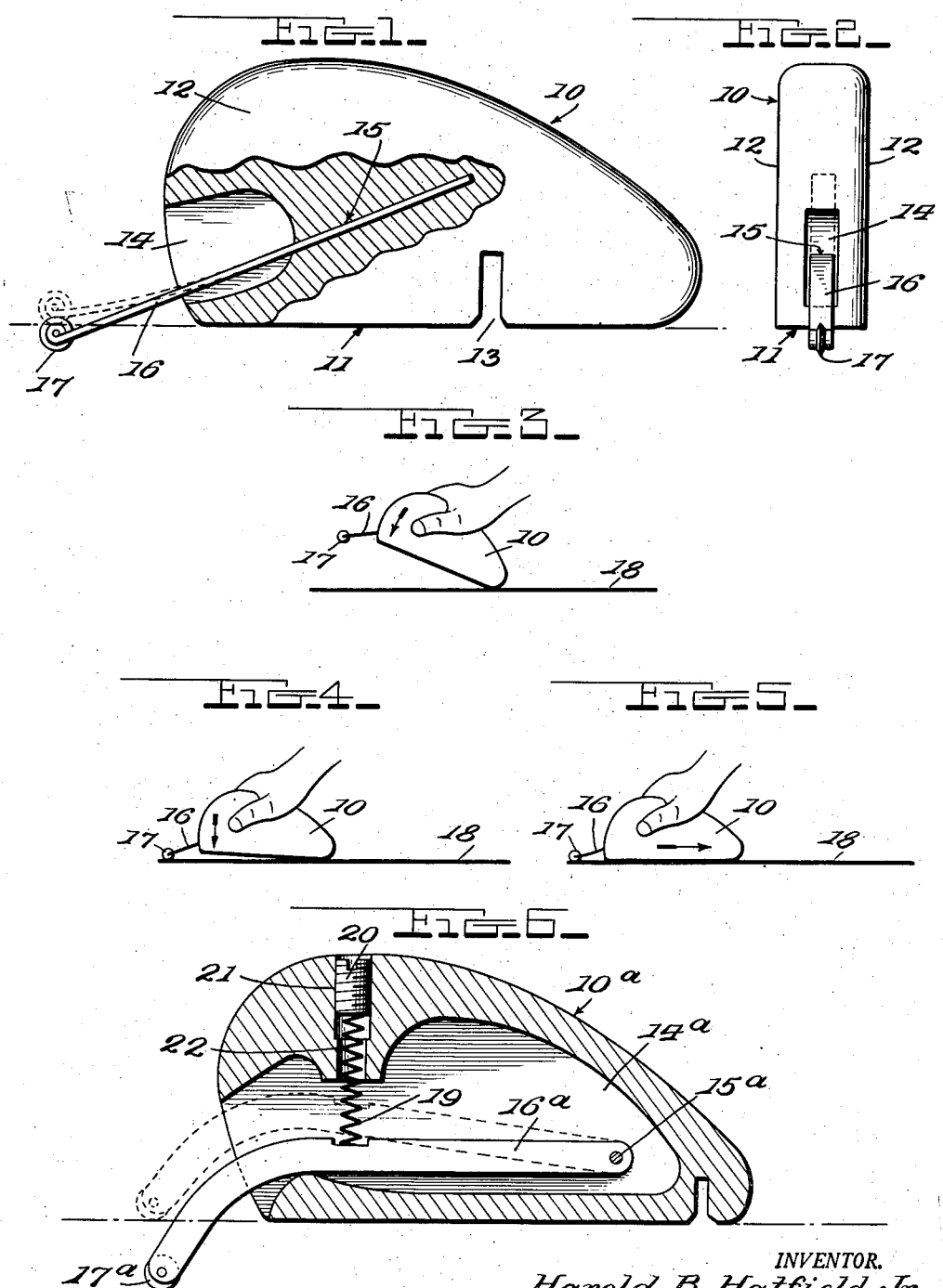
INVENTOR.
Harold B. Hatfield, Jr.
BY
atty.

Patented Aug. 10, 1954

2,685,764

UNITED STATES PATENT OFFICE 2,685,764

GLASS CUTTER

Harold Burgess Hatfield, Jr., Sharon Hill, Pa.

Application December 29, 1952, Serial No. 328,496

2 Claims. (Cl. 49—52)

The most common form of glass cutter, comprising an elongated handle having a glass scoring element on one end, gives excellent results when used by a person having such experience and skill as to enable him to hold the scoring element against the glass with the proper pressure during performance of the scoring operation. However, before such experience and skill are attained, frequent failures occur accompanied by waste of time and glass. Therefore, the need of a glass cutter which would insure proper pressure of the scoring element against the glass, has long been recognized. This need has given rise to the proposal of various devices, any of which would probably attain the desired result, but most of which have been so expensive and/or complicated as to withhold them from the market. As a result, the cutter above mentioned with its requirements of experience and skill, is still the only available reasonably priced cutter.

The present invention is designed to provide a new and improved glass cutter of extreme simplicity which may be easily manufactured and marketed at a reasonable price, yet will fulfill the requirement of exerting the proper constant pressure of the scoring element against the glass.

In carrying out the above end, a further object of the invention is to provide a novel glass cutter comprising a body carrying a forwardly projecting arm provided with a glass scoring element, said body being adapted to be hand-held and hand-slid upon a piece of glass to be cut, and said arm being resiliently biased downwardly to a normal idle position in which the scoring element occupies a normal position below the plane of the lower side of the body. Thus, when the scoring element and body are placed on a piece of glass and said body is held down flat against the glass, the scoring element will be held against the glass with uniform pressure while the body is being slid upon the glass, the result being uniform scoring with proper pressure, permitting accurate severance of the glass along the scored line.

Another object is to provide a novel construction which permits the easy substitution of a new arm and scoring element when the original scoring element has become dull.

Yet another object is to provide a novel construction in which the body may be readily formed from either soft metal or a modern plastic to facilitate manufacture.

With the above and other objects in view that will become apparent as the nature of the invention is better understood, the same consists in the novel form, combination and arrangement of parts hereinafter more fully described, shown in the accompanying drawing, and particularly claimed.

In the drawing:

Figure 1 is a side elevation, partly broken away and in section, showing the preferred construction;

Figure 2 is a front end elevation of the form of construction shown in Figure 1;

Figures 3, 4, and 5 are diagrams showing the method of using the device of Figures 1 and 2, and Figure 6 is a vertical longitudinal sectional view, partly in elevation, showing a different form of construction.

The forms of construction shown in the drawing will be rather specifically described, but it is to be understood that variations may be made within the scope of the invention as claimed.

In the construction illustrated in Figures 1 to 5, a body 10 is shown, said body being of size and shape to be readily held between the thumb and fingers of one hand and to be readily slid upon a piece of glass. This body is preferably of substantially ovate form in profile but is provided with a flat lower side 11 to be slid upon the glass. The sides 12 of the body are preferably substantially upright, and said body is provided with a suitable breaking notch 13 which opens through said sides 12 and through the flat lower side 11.

A recess 14 is formed in the front end of the body 10 and opens forwardly. From the rear end of this recess 14 a relatively long and narrow socket 15 extends rearwardly in the body, said socket 15 being rearwardly inclined. A spring arm 16 extends through the recess 14 and has its rear end portion frictionally held in the socket 15. This spring arm projects forwardly from the body 10 and carries a glass-scoring wheel 17 or other glass-scoring element. The arm 16 is normally downwardly biased to an idle position in which the scoring element 17 is below the plane of the lower side 11 of the body 10, as shown more particularly in Figure 1, but said arm is yieldable to permit both said element 17 and side 11 to rest on a piece of glass, as will be clear from the dotted lines in Figure 1 and from the diagrammatic illustration in Figure 5. When the arm 16 occupies the dotted position of Figure 1, its tension is such that it will hold the scoring element 17 against the glass with the required pressure to properly score the latter as the body 10 is slid along the desired path.

In using the cutter, the steps illustrated in Figures 3 to 5 are followed. In these views, the heavy line 18 represents a piece of glass to be cut. The heel of the body 10 is first rested upon the glass as shown in Figure 3 and said body is then tilted as indicated by the arrows in this view, to bring the scoring element 17 against the glass as illustrated in Figure 4. Downward pressure is then exerted upon the body 10 as indicated by the arrow in Figure 4 to rock said body to the position of Figure 5 with its flat lower side 11 against the glass. This movement tensions the arm 16. The body 10 is then slid upon the glass as indicated by the arrow in Figure 5 and during this operation the scoring element 17 is held against the glass with proper uniform pressure, resulting in a clean score of uniform depth and thus insuring clean breakage of the glass along the score line. After scoring the glass, the heel of the body 10 may be used to gently tap it along the score line to effect severance along said line. When cutting close to an edge of the glass, the notch 13 may be used to effect the final severance, in the same way as the notches of the conventional glass cutter are used.

In Figure 6, the body 10ª is recessed throughout the greater part of its length as shown at 14ª. In this recess an arm 16ª is pivoted at 15ª. The front end of this arm projects forwardly from the body 10ª and carries a scoring element 17ª. The arm 16ª is not a spring arm but it is downwardly biased by a coiled spring 19 held under compression by a screw plug 20. The body 10ª is suitably recessed at 21 and 22 to receive the plug and spring.

The device of Figure 6 is operated in the same manner as that of Figures 1 to 5 and insures the same desirable result.

When the scoring element 17 of Figures 1 to 5 becomes dull, the arm 16 carrying said element may be pulled from the socket 15 and a new arm carrying a new scoring element readily substituted. Instead of doing this, however, a new scoring element could simply be substituted for the old. This latter procedure may be followed also with the form of construction shown in Figure 6.

From the above detailed description of the invention, it is believed that the construction, use, and operation thereof will at once be apparent, and while there are herein shown and described the preferred embodiments of the invention, it is nevertheless to be understood that minor changes may be made therein without departing from the spirit and scope of the invention as claimed.

I claim:

1. A glass cutter comprising a body adapted to be hand-held and hand-slid upon a piece of glass, said body having a flat lower side to rest on the glass, said body having a slot terminating inwardly of the forward end of the body with the forward end of the slot opening into a recess at the edge of the body, a downwardly projecting spring arm having one end mounted in said slot, projecting through said recess and carrying a cutter means at its lower end, said spring arm extending in a straight line to a plane below the lower side of the body in its idle position, whereby when said lower side of said body is held down upon a piece of glass, the cutter means will be moved into a plane incident to the plane of said lower side and held under predetermined pressure in scoring engagement with a piece of glass.

2. A glass cutter as in claim 1, wherein the recess is at the forward end of the body and the lower end of the spring arm and glass cutter means terminate forwardly of the body.

References Cited in the file of this patent

UNITED STATES PATENTS

| Number | Name | Date |
|---|---|---|
| 365,057 | Duncan | June 21, 1887 |
| 507,395 | Walsh | Oct. 24, 1893 |
| 682,966 | Tester | Sept. 17, 1901 |

FOREIGN PATENTS

| Number | Country | Date |
|---|---|---|
| 33,821 | France | Aug. 21, 1928 |
| | (1st addition to No. 573,481) | |
| 1,007,560 | France | Feb. 6, 1952 |